United States Patent [19]

Brown et al.

[11] Patent Number: 4,506,552
[45] Date of Patent: Mar. 26, 1985

[54] COAXIAL FLOWPATH APPARATUS

[75] Inventors: Alvin E. Brown, Santa Cruz; Donald P. Henneuse, Scotts Valley, both of Calif.

[73] Assignee: Manning Technologies, Inc., Scotts Valley, Calif.

[21] Appl. No.: 570,179

[22] Filed: Jan. 12, 1984

[51] Int. Cl.³ ............................................. G01F 15/14
[52] U.S. Cl. ................................................. 73/861.28
[58] Field of Search ........... 73/861.27, 861.28, 861.29, 73/861.18, 273

[56] References Cited

U.S. PATENT DOCUMENTS 4,140,012  2/1979  Hendriks .
4,162,111  7/1979  Brown .
4,325,262  4/1982  Meisser et al. .
4,480,486  11/1984  Meisser et al. ................... 73/861.28

Primary Examiner—Herbert Goldstein

[57] ABSTRACT

An apparatus for the ultrasonic measurement of cryogenic or high viscosity fluid flow provides for precooling and symmetrical flow in the measuring run of one of two coaxial inner and outer cylinders. A baffle in one of the cylinders directs fluid flow so as to encircle the measuring path cylinder thereby cooling it and reducing heat loss and flashing against the walls. Symmetrical entry and exit of the fluid flow in and out of the measuring cylinder eliminates the effects of velocity gradients on the ultrasonic measuring signals. Inlet and outlet ports are located perpendicular to the coaxial cylinders allowing a longer measuring run without requiring a similar interruption to the pipe system being monitored.

19 Claims, 5 Drawing Figures

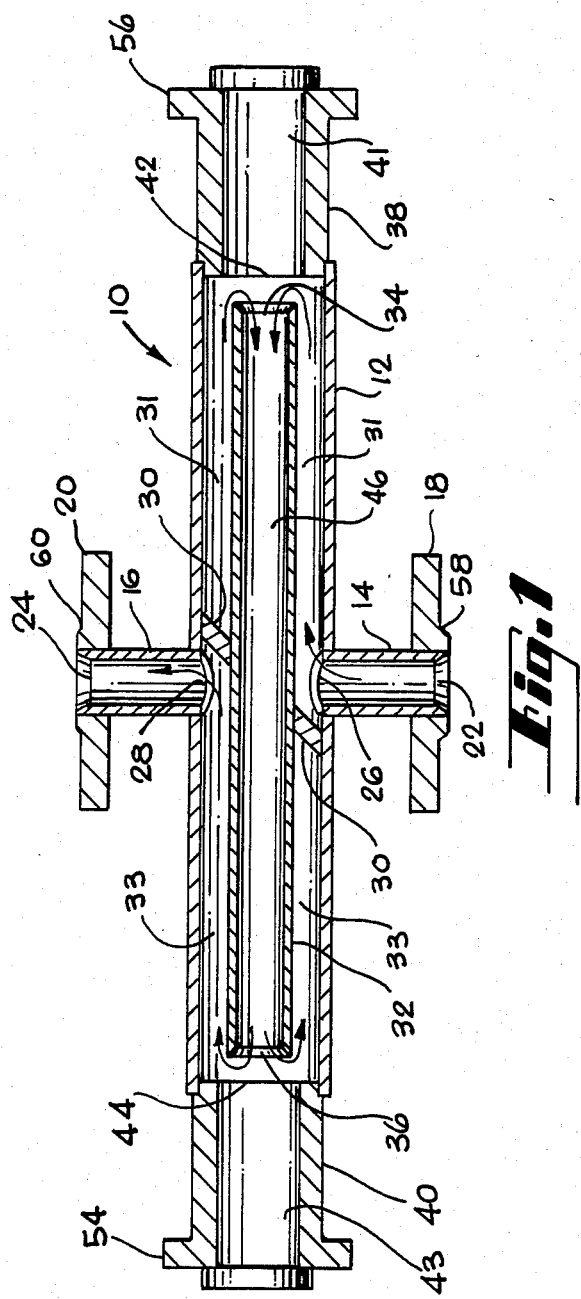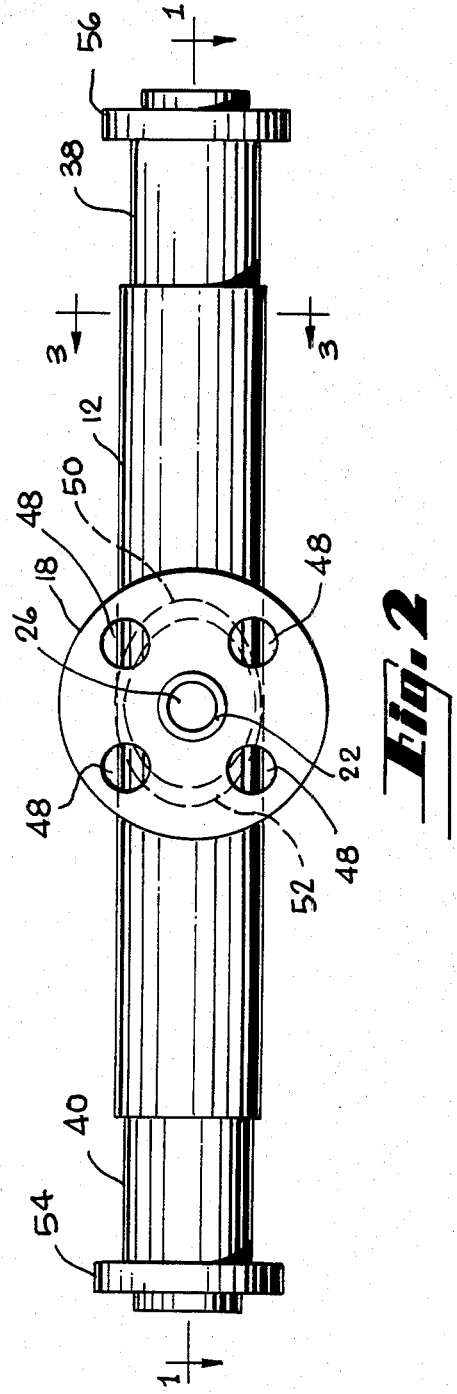

COAXIAL FLOWPATH APPARATUS

DESCRIPTION

1. Technical Field

The invention relates to fluid flow measuring apparatus and more particularly to an apparatus having coaxial cylinders for measurement of cryogenic or high viscosity fluid flow by ultrasonic signals.

2. Background Art

The measurement of the flow of cryogenic fluid through pipes in axial ultrasonic flowmeters presents a problem of "flashing," bubbles along the pipe wall caused from heat transfer through the wall. In addition, when cryogenic or high viscosity fluids are being measured, any sharp change of fluid direction, e.g., into the axial measuring run from corners, results in velocity gradients in the flow caused by eddy currents at the corners. When ultrasonic signals are used to measure such flows by transmitting sound wave pulses axially with and against the flow direction, these velocity gradients cause refraction or bending of the ultrasonic pulses, causing multiple paths in one direction which are not symmetrical in the measuring run and out of phase with the returning signal in the opposite direction. This phase shift is a false indication of flow since it is caused by eddy currents formed in the flowmeter itself and not due to flow characteristics of the fluid in the pipeline. Bubbles and turbulence caused by the flowmeter structure may result in cavitation and interference with flow measuring.

In U.S. Pat. No. 4,325,262 Meisser et al. disclose an apparatus having two fluid receiving and discharge chambers which surround the measuring tube. The fluid receiving and discharge chambers are formed of two right-angle pipes of increasing diameter which direct flow at the entry and exit of the measuring tube. The chambers and the inlet and outlet ports have greater cross sectional areas than the measuring tube and are not of constant diameter, which may cause loss of head pressure when the fluid flow enters the measuring tube.

In U.S. Pat. No. 4,140,012, Hendriks discloses an assembly having two outside chambers separated by a 45 degree baffle to form separate receiving and discharge chambers. The baffle directs flow from the receiving chamber through an inner measuring tube, then out through the discharge chamber. The placement of the 45 degree baffle is proximate to the entry of the inner chamber at one end and proximate to the exit of the inner chamber at the other end causing asymmetrical entry and exit of the flow into the inner chamber. Transducers facing the inner measuring tube ends project out into the flowpath. Vorticies are formed in the flow to increase flow over the transducer faces.

It is the object of the invention to devise a flowpath structure for measuring cryogenic and high viscosity fluid flow which would have greater accuracy and stability than is found in the prior art.

DISCLOSURE OF INVENTION

The above objects have been met by a flowpath apparatus which compensates for fluid irregularities in the measuring path by providing symmetrically coaxial cylinders, including a first ingress and egress cylinder and a second measuring path cylinder. Circular symmetry and the isolation of ingress and egress ports from the measuring path limits the effects of velocity gradients, flashing and refraction. The elongated measuring path cylinder is centered coaxially inside a larger cylinder. Inlet and outlet ports are perpendicularly located. In the preferred embodiment, an annular baffle placed between the inlet and outlet ports near the mid point of the inner wall of the outside cylinder directs the flow of incoming fluid to encircle a substantial portion of the length of the measuring cylinder in such a way that it pre-cools the entry end of the inner cylinder. Fluid passes axially down the measuring path cylinder before exiting and symmetrically passing down the outside wall of the measuring path cylinder, providing additional pre-cooling before it exits at the outlet port. Pre-cooling of the inner measuring path cylinder eliminates flashing or bubbling along the walls of the inner cylinder caused by heating of cryogenic fluids through the wall. A ratio of at least 15 to 1 between the length of the measuring cylinder and its inner diameter provides the needed transit time for velocity measurements. The uniform entry into and exit out of the inner measuring path cylinder avoids uncompensated refractive layers which cause metering errors.

Cross sectional areas along the length of the inner cylinder are equal. Similarly cross sectional areas are constant over the length of the outer cylinder and the mounting means for the inlet and outlet ports. There is no loss of head pressure due to constrictions in the measuring path. In the preferred embodiment any refraction effects on the measuring signal which arise at the entry are cancelled by circular symmetry. Therefore, changes in phase relation of the measurement signal are due to flow velocity differences, not to fluid irregularities in the measuring path. In the preferred embodiment the faces of the ultrasonic transducers placed at either end of the measuring run are larger than the inside diameter of the measuring path cylinder providing for full cross sectional coverage of the measuring path. Sonic waves traveling outside of the inner cylinder run into the baffle and dissipate.

Due to the coaxial placement of the inner and outer cylinders efficient cooling and symmetrical flow are achieved without complicated flow patterns. The inner measuring path cylinder runs perpendicular to the inlet and outlet ports, allowing a large measuring run while requiring only a short distance between the ports. Thus interruption of a pipe system being metered is kept to a minimum. Mounting means with flanges may be provided on the inlet and outlet ports for convenient bolting onto a pipe system.

BRIEF DESCRIPTION OF THE DRAWINGS

FIG. 1 is a cross section of the plan view of the preferred embodiment of the apparatus of the present invention.

FIG. 2 is a front elevation of the apparatus of FIG. 1.

BEST MODE FOR CARRYING OUT THE INVENTION

Figure 3:
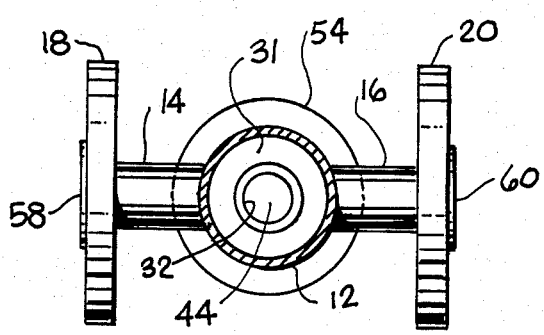
FIG. 3 is an end section taken along lines 3—3 of FIG. 2.

With reference to FIG. 1, a preferred embodiment of the coaxial flowpath apparatus 10 is shown. An elongated outer cylinder 12 coaxially surrounds an elongated inner or measuring cylinder 32 of smaller diameter and length. An annular baffle 30 divides the outer cylinder at a 45 degree angle. The elliptically shaped baffle is a ring having an opening through which the inner cylinder 32 is placed. Inlet port 26 and outlet port 28 are cut into diametrically opposed walls of the outer cylinder. The ports are located on opposite sides of the baffle. The ports may be connected by entry conduit 14 and exit conduit 16 to a pipe line by means of flanges 18 and 20. Alternately, the apparatus may be fitted directly to a pipe line by providing threading in the inlet port 26 and outlet port 28. Fluid enters the apparatus by means of ingress 22 to entry conduit 14 and then to cylinder inlet port 26, passes in the direction shown by the arrows circulating up and around the circumference of the inner cylinder in the area to the right of baffle 30. The flow continues to the front opening 34 of the measuring run inside the inner cylinder, passing by face 42 of an ultrasonic transducer 41 placed in a transducer adaptor 38 which acts to close off the end of the outer cylinder. The flow pours symmetrically over the edge of the front entrance 34 of the measuring run and flows straight down the measuring run 46. Fluid exits symmetrically near the face 44 of the opposite ultrasonic transducer 43 located in transducer adaptor 40 by pouring out the measuring run back exit 36.

The fluid then circulates around the outside walls of the inner cylinder 32 to the left of baffle 30 before exiting through outlet port 28 into exit conduit 16 and back to the pipe system through egress 24. The arrows in FIG. 1 indicate the direction of the flow in and out of the flowpath apparatus and the effect of the baffle placement to force the flow through the measuring run of inner cylinder 32. The entry into the measuring cylinder at 34 is symmetrical, coming out the constant diameter of the pre-cooling section 31 of outer cylinder 12, making an abrupt turn at transducer face 42. Any refraction effects by velocity gradients caused by this abrupt turn are cancelled by equal and opposite refraction effects at the opposite end of the measuring run at 36 when the fluid makes another abrupt reversal at the face 44 of the opposite transducer before exiting out of the apparatus. Due to this symmetry any phase shift between the receiving or the sending and the receiving signals will be due solely to the fluid flow being measured, not to the geometry of the apparatus.

Fluid flow passing down the measuring run will be in contact with pre-cooled side walls due to the circulation in the pre-cooling sections 31 and 33. This avoids formation of bubbles or flashing in the cryogenic fluid, which would cause interference gaps in the signal from the transducer due to the cavitation. The inner cylinder of the preferred embodiment has a length at least 15 times the inside diameter. This length-to-diameter ratio provides for sufficient length for accurate ultrasonic measurement. The diameter of the measuring path cylinder should provide adequate velocity to make the readings.

Transducers 41 and 43 are of the ultrasonic type commonly used for transmissive flowmeters. A piezo electric ultrasonic transducer similar to that described in U.S. Pat. No. 4,162,111 may be inserted into transducer adaptors 38 and 40 and secured by means of flange couplings 54 and 56 shown in FIG. 1. In the preferred embodiment the faces 42 and 44 of the transducers 43 and 41 are larger than the diameter of the measuring path 46. The wave front of the ultrasonic signal will then fill the distance sufficiently to average out all flow components contained therein when the ultrasonic signals are transmitted axially parallel with the flow of the cryogenic or high viscosity fluid. Any sound which runs outside of the measuring path cylinder will run into the baffle 30 and be dissipated. Therefore, little energy from echos or reflections would be returned to the transducer from sound that goes outside the measuring run. Alternately, the faces of the transducers may be smaller than the diameter of the measuring path. The ultrasonic pulse is alternately sent back and forth between two piezo electric crystal transducers. The piezo electric ultrasonic transducers 41 and 43 are placed in transducer adaptors 38 and 40 which provide closing plugs at either end of the outer cylinder.

The elliptical shape of the 45 degree baffle 30 is shown in FIG. 2 by dashed lines 50 and 52. The flowpath apparatus may be connected to the pipe line by means of flanges 18 and 20 on the entry 14 and exit 16 conduits as indicated by flange 18 in FIG. 2. Means for attachment are provided by bolt holes 48. Flow from the pipe line enters by means of ingress 22, passing into the outer cylinder by means of inlet port 26 cut into the wall of the outer cylinder. Transducer adaptors 38 and 40 are aligned on the same axis as the inner and outer cylinders so that measuring ultrasonic pulses may be sent parallel to the flow in the inner cylinder. The apparatus may also be connected to the pipe line by threaded fitting in the inlet and outlet ports.

FIG. 3 shows the parallel alignment on the same axis of the two flanges 18 and 20 of the entry and exit conduits 14 and 16. Rims 58 and 60 on the outside faces of the flanges are provided to insure a tight fit with the pipe system. At the end of the measuring run of the inner cylinder 32 is the transducer face 44. FIG. 3 also indicates the compact arrangement of the measuring run which is set perpendicular to the direction of flow in the entry and exit conduits connected to the pipeline. For example, for use on a half-inch pipe line the distance between rim 58 to 60 would be approximately five inches.

Figure 4:
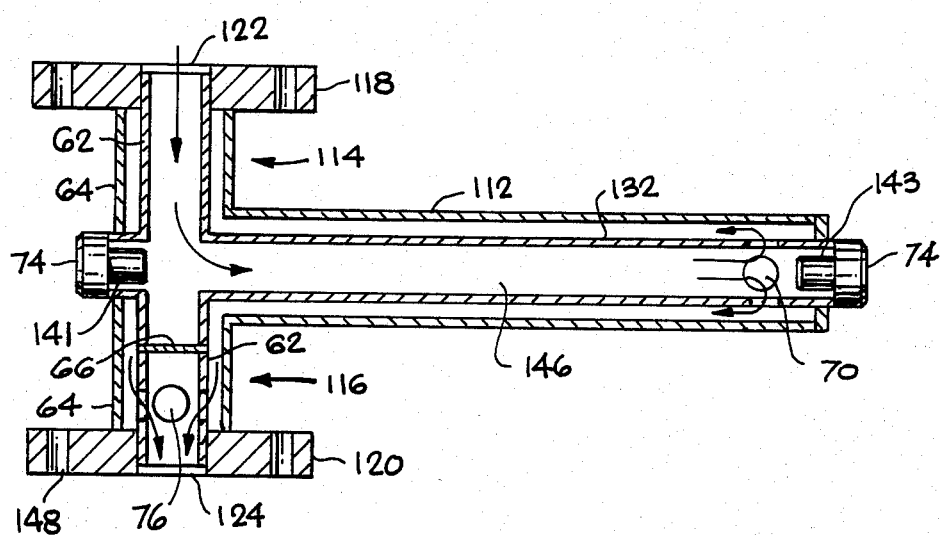
FIG. 4 is a part cross section of the plan view of an alternative embodiment of the apparatus of the present invention.

FIG. 4 shows an alternative T-shaped embodiment of the coaxial flowpath apparatus in which the entry conduit 114 and exit conduit 116 are located at the end of the coaxial cylinders and fluid enters the inner measuring cylinder 132 directly from the pipe line through the inlet port 122 of entry conduit 114 as indicated by the arrows. The entry and exit conduits of this embodiment have a double wall construction with an inner pipe 62 connected to the inner measuring cylinder 132 and an outer coaxial pipe 64 connected to the outer cylinder 112. A baffle in the form of a plug 66 is placed in the inner pipe 62 in exit conduit 116, forcing fluid flow to pass into the measuring run 146 between ultrasonic transducers 141 and 143. Flow then passes out symmetrically into the outer cylinder through four holes 70 cut radially equidistant from the cylinder axis around the end of the inner cylinder. Flow continues in a reverse direction down the outer cylinder thereby chilling the walls of the inner cylinder. Fluid flow then passes into the outer pipe 64 in exit conduit 116 and back into the inner pipe 62 posterior to the plug 66 by means of four holes 76 cut radially equidistant near the outlet port 124 in the exit conduit 116. Flanges 118 and 120 provide means for attaching the apparatus to the pipe line system.

The double walled construction of this T-shaped apparatus yields complete cooling of the inner measuring cylinder between connections to the pipe line system. In this manner, no warming of the fluid occurs on contact with the entry and exit conduits and no flashing occurs in these regions.

The length of the measuring cylinder is such that the longitudinal wave front sent from one transducer completely fills the cylinder prior to being received by the other transducer at the opposite end. By this means, the wave front passes through sufficient fluid to obtain an average wave front velocity measurement.

The transducers 141 and 143 are placed in a damped housing 74 as described in U.S. Pat. No. 4,162,111 which provides a spring and diphragm connection for electrically insulating the piezo electric crystal of the ultrasonic transducers from the protective housing without the use of temperature susceptible materials.

Figure 5:
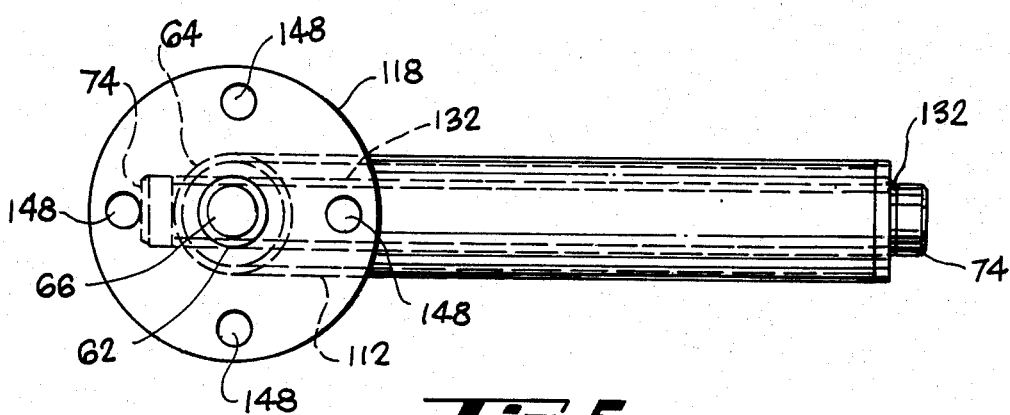
FIG. 5 is a front elevation of the apparatus of FIG. 4.

FIG. 5 shows the bolt holes 148 in flange 118 for mounting the alternative T-shaped embodiment of the apparatus onto a pipe line system. Dotted lines show the interrelationship and constant cross-sectional areas of the inner and outer cylinders 132 and 112 with the inner 62 and outer 64 pipes of the entry and exit conduits. Through inlet port 122 can be seen the baffle plug 66.

The flowpath apparatus may be made from stainless steel but can also be made out of plastic material such as polyvinyl chloride. The fabrication of the 45 degree annular baffle for the preferred embodiment may be accomplished by boring through the center of a steel block, at a 45 degree angle, a hole of a diameter equivalent to the outside diameter of the inner cylinder. The pipe to be used for the outer cylinder is cut at a 45 degree angle to the horizontal length and the outside rim of the steel block is trimmed at a 45 degree angle to the outside diameter dimension of the outer cylinder. The two halves of the outer cylinder are then butted against the steel disk and welded at the outer wall contacts. This forms an elliptical baffle splitting the outer cylinder into two sections surrounding the inner cylinder.

The coaxial flowpath apparatus may be connected with flowmeter electronic circuitry for measuring either cryogenic or high viscosity fluid flow. The flowpath provides for both precooling of the measuring path cylinder and symmetrical entry and exit of the fluid between the measuring ultrasonic transducers. The flowpath apparatus provides a measuring path of sufficient length to average out laminar and turbulent slugs in the fluid flow without requiring an equivalent interruption in the pipe system.

We claim:

1. A flowpath apparatus for ultrasonic flowmeters comprising,
   an elongated inner cylinder, mounted coaxially within an elongated outer cylinder, said inner cylinder defining a measurement path and having openings for fluid communication with said outer cylinder,
   a fluid inlet port and a fluid outlet port opening into one of said cylinders, the ports opening radially away from the common axis of the cylinders,
   a baffle separating the inlet port from the outlet port whereby a flow path is formed through a substantial length of one cylinder before passing through the second cylinder, and
   means for mounting ultrasonic transducers on the same common axis of the cylinders for receiving and sending ultrasonic signals parallel to flow in the inner cylinder.

2. The apparatus of claim 1 wherein the length of the outer cylinder exceeds the length of the inner cylinder, the outer cylinder having ends extending beyond the ends of the inner cylinder, said inner cylinder having open ends in fluid communication with said outer cylinder, said inlet and outlet ports are in the walls of the outer cylinder, the ports distal to the ends of the inner measuring cylinder at a distance such that flow into and out of the inner cylinder is radially symmetric, said baffle is annular and extends radially from the outside wall of the inner cylinder to the inside wall of the outer cylinder, separating the inlet port from the outlet port, whereby fluid flow is channeled from said inlet to said outlet port by way of said inner cylinder, said means for mounting ultrasonic transducers are at each end of the outer cylinder, said means closing each end of said outer cylinder, and said ultrasonic transducers are mounted at each end of the outer cylinder facing the ends of the inner cylinder and aligned on the same axis.

3. The apparatus of claim 2 wherein said inlet and outlet ports in the walls of the outer cylinder are connected to an entry conduit and an exit conduit, said conduits having flanges at the ends of the conduits distal to the inlet and outlet ports for mounting said apparatus to a pipeline, said conduits and flanges aligned on an axis extending radially away from the common axis of said cylinders.

4. The apparatus of claim 2 wherein said inlet and outlet ports are provided with threaded fittings for mounting said apparatus to a pipeline.

5. The apparatus of claim 2 wherein said annular baffle extends radially from the inner cylinder walls at an angle to the cylinder longitudinal axis.

6. The apparatus of claim 2 wherein said inner cylinder is mounted inside said outer cylinder by means of said baffle.

7. The apparatus of claim 2 wherein said ultrasonic transducers have sound transfer surfaces of larger diameter than the diameter of said inner cylinder.

8. The apparatus of claim 2 wherein said ultrasonic transducers have sound transfer surfaces of smaller diameter than the diameter of said inner cylinder.

9. The apparatus of claim 1 wherein said inlet and outlet ports are connected to one end of the inner cylinder by means of entry and exit conduits extending radially away from the common axis of said cylinders, said entry and exit conduits comprising inner pipes coaxially supported within outer pipes which are in fluid communication with said outer cylinder, and said baffle comprises a plug in the exit conduit proximate to the inner cylinder wall whereby the fluid flow is channeled from the inlet port into the entry conduit and down the length of said inner cylinder, the inner cylinder having fluid communication at the opposite end with the outer cylinder whereby fluid flow is channeled back down through the outer cylinder to the exit conduit and outlet port which is in fluid communication with the outer cylinder on the side of the plug distal to the inner cylinder wall.

10. The apparatus of claim 9 wherein said transducer mounting means are located in opposite ends of the inner cylinder, said means closing each end of said cylinder.

11. A flowpath apparatus for an ultrasonic flowmeter comprising,
    elongated coaxial inner and outer cylinders, said inner cylinder forming an axial measuring section for measurement of fluid flow, said outer cylinder having ends extending beyond the ends of the inner cylinder, and having inlet and outlet ports for said flow, which are distal to the ends of said outer cylinder, transducer mounting means closing off the ends of said outer cylinder, a baffle splitting the interior of said outer cylinder proximate to said ports so as to form a cylindrical section connected to the inlet port and a cylindrical section connected to the outlet port, said inner cylinder having open ends providing fluid flow passage between said sections, said cylindrical sections encircling said inner cylinder whereby said inner cylinder is cooled, and ultrasonic transducers mounted in the mounting means at the ends of the outer cylinder, spaced from and facing the inlet and outlet ends of the inner cylinder.

12. The apparatus of claim 11 wherein each of said cylinders has a constant cross section.

13. The apparatus of claim 11 wherein said transducers have sound transfer surfaces of diameters larger than the diameter of the inner cylinder.

14. The apparatus of claim 11 wherein said transducers have sound transfer surfaces of diameters smaller than the diameter of the inner cylinder.

15. The apparatus of claim 11 further defined by said inner cylinder having walls tapering toward the ends of the inside edge at its open ends.

16. A flowpath apparatus for ultrasonic flowmeters comprising, an elongated open-ended inner cylinder, the ratio of the length of said cylinder substantially exceeding its inside diameter, supported at the mid-section by a radially extending annular baffle to a coaxial elongated outer cylinder having a larger diameter and length than the inner cylinder, said baffle forming a barrier to fluid flowing from one end of the outer cylinder to the other end in a longitudinal direction along the outer walls of said inner cylinder, an inlet port and an outlet port placed near the mid-section of the wall of said outer cylinder facing opposite sides of said baffle, whereby fluid flow entering the inlet port is forced to pass through the open ends of the inner cylinder to reach the outlet port, said ports at sufficient distance from the ends of said inner cylinder so as to cause a symmetrical entry and exit of fluid flow in the inner cylinder, transducer adaptors closing each end of the outer cylinder, aligned on the same longitudinal axis as the cylinders, and ultrasonic transducers placed in said adaptors for measurement of axial fluid flow in said inner cylinder.

17. The apparatus of claim 16 wherein said annular baffle extends radially from the inner cylinder walls at an angle to the cylinder axis.

18. The apparatus of claim 16 wherein mounting means are provided at said inlet and outlet ports for mounting said apparatus to a pipeline, said mounting means aligned on an axis extending radially away from the common axis of said cylinders.

19. The apparatus of claim 16 wherein said inlet and outlet ports are provided with threaded fittings for mounting said apparatus to a pipeline.

* * * * *